(12) United States Patent
Nasser (10) Patent No.: US 8,659,389 B2
(45) Date of Patent: Feb. 25, 2014

(54) SECURE INVENTORY CONTROL SYSTEMS AND METHODS FOR HIGH-VALUE GOODS

(75) Inventor: Gabriel G. Nasser, Dubai (AE)

(73) Assignee: The Jewellery Store, Dubai (AE)

( * ) Notice: Subject to any disclaimer, the term of this patent is extended or adjusted under 35 U.S.C. 154(b) by 1079 days.

(21) Appl. No.: 12/337,188

(22) Filed: Dec. 17, 2008

(65) Prior Publication Data

US 2010/0148934 A1    Jun. 17, 2010

(51) Int. Cl.
*H04Q 1/00*    (2006.01)

(52) U.S. Cl.
USPC .............. 340/5.8; 340/5.92; 340/1.1; 705/22; 705/28

(58) Field of Classification Search
USPC ................ 340/5.8, 5.92; 705/22, 28
See application file for complete search history.

(56) References Cited

U.S. PATENT DOCUMENTS

| | | | |
|---|---|---|---|
| 6,421,656 B1 | 7/2002 | Cheng et al. | |
| 6,584,459 B1 | 6/2003 | Chang et al. | |
| 6,801,130 B2* | 10/2004 | Campero | 340/572.1 |
| 6,890,976 B2 | 5/2005 | Sinnige et al. | |
| 6,970,881 B1 | 11/2005 | Mohan et al. | |
| 7,040,532 B1* | 5/2006 | Taylor et al. | 235/375 |
| 7,146,356 B2 | 12/2006 | Choi et al. | |
| 7,397,362 B2* | 7/2008 | Zhang et al. | 340/506 |
| 2005/0108211 A1 | 5/2005 | Karimisetty et al. | |
| 2005/0247779 A1* | 11/2005 | Ohkubo et al. | 235/383 |
| 2006/0047636 A1 | 3/2006 | Mohania et al. | |
| 2006/0122944 A1 | 6/2006 | Ryan et al. | |
| 2006/0277092 A1* | 12/2006 | Williams | 705/10 |
| 2007/0057768 A1* | 3/2007 | Zeng et al. | 340/10.1 |
| 2007/0108273 A1* | 5/2007 | Harper et al. | 235/382 |
| 2007/0203893 A1 | 8/2007 | Krinsky et al. | |
| 2008/0128498 A1 | 6/2008 | Fausak et al. | |
| 2008/0129037 A1* | 6/2008 | Roth et al. | 283/85 |
| 2008/0228716 A1 | 9/2008 | Dettinger et al. | |
| 2008/0263006 A1 | 10/2008 | Wolber et al. | |
| 2010/0148964 A1* | 6/2010 | Broer | 340/572.1 |

FOREIGN PATENT DOCUMENTS

| | | |
|---|---|---|
| EP | 1143349 | 10/2001 |
| WO | WO-2008033954 A2 | 3/2008 |
| WO | WO-2008063974 | 5/2008 |

OTHER PUBLICATIONS

International Search Report and Written Opinion for PCT/IB2009/007950, dated Apr. 22, 2010, 8 pages.

* cited by examiner

*Primary Examiner* — George Bugg
*Assistant Examiner* — Naomi Small
(74) *Attorney, Agent, or Firm* — Goodwin Procter LLP (57) ABSTRACT

Embodiments of the present invention include methods and systems for tracking and monitoring high-value goods by scanning RFID tags associated with the goods. A central monitoring service verifies both the RFID tags and the devices used to scan the tags against a database of known and trusted tags and scanning devices. Local and centralized security protocols provide improved security and data integrity.

25 Claims, 7 Drawing Sheets

SECURE INVENTORY CONTROL SYSTEMS AND METHODS FOR HIGH-VALUE GOODS

TECHNICAL FIELD

This invention relates to methods and systems for tracking and monitoring high-value goods, and, more particularly, for using RFID tracking techniques to provide secure, remote product inventory and movement reporting to multiple parties.

BACKGROUND

The location and movement of high value assets such as jewelry, coins and collectibles that are small, easily moved and often financed or sold on consignment are difficult to track, authenticate and audit. This is due to the fact that many retail locations where the goods are displayed and sold carry hundreds or thousands of pieces and numerous staff members may have access to the articles at any time and because of the high value and relatively small size, the articles are prone to theft. Further, due to the uncertainty in the price of gold and other precious metals, the legal ownership of the items often rests with a third party (e.g., a bank, insurer, or other entity) in order to insulate the retail establishments from wide fluctuations in the precious metals markets. These third parties must maintain some degree of certainty that the inventory of goods on hand is accurate, but rarely have the manpower or means to perform physical inspections.

As such, third-party security firms (e.g., Brinks, Wells Fargo, etc.) are often engaged to periodically visit local storefronts and perform on-site inventory audits. The use of third party auditors is due primarily to the fact that many instances of theft are done with the help of store owners or retail staff—effectively an "inside job." It is critical, therefore, for these audits to be performed quickly and accurately, but also to ensure that the data collected at each location and sent to offsite is secure and tamper-proof.

In recent years, inventory management and control has been facilitated by the adoption of radio frequency identification (RFID) to identify and track goods as they pass through the supply, manufacturing and retail chains. A typical RFID system consists of three components: an antenna, a transceiver/decoder, and a transponder (referred to herein as an RFID tag, or tag). The antenna emits electromagnetic radio signals generated by the transceiver, which in turn activates the tag, thereby allowing data to be read from, or in some instances, written to the tag. In some implementations, the antenna, transceiver and decoder are integrated into a single interrogation device that may be configured as a hand-held or as a fixed-mount device.

One advantage of RFID systems is the non-contact, non-line-of-sight capability of the technology. The tags can be read through a variety of materials, such as glass, cardboard, wood, opaque plastics and other materials commonly used for the packaging and/or displaying of small valuable goods that would otherwise pose challenges to bar-code systems or other optically-read technologies. The scanning of RFID tags can also be accomplished at remarkable speeds, in most cases responding in less than one hundred milliseconds.

Installation and operational control of the various components of an RFID inventory control system is generally done on-site. Unfortunately, such a practice, coupled with the number of individuals with access to the inventory and the systems creates many opportunities to "cheat" the system. Often by the time the owner of the goods can detect a theft, it is too late. Therefore, what is needed is a technique and supporting systems that can quickly and accurately identify and track small, high-value goods in a manner that is virtually tamper-proof. Further, such systems should provide authorized individuals with remote access to real-time data related to their inventory, no matter what the location.

SUMMARY OF THE INVENTION

The present invention is directed toward inventory monitoring systems using RFID devices. Many applications exist in which it is important to know whether tagged items are present or absent within a defined space (e.g., a counter, shelf, or display case). Tags having RFID elements are attached to the items in a given area of interest (the defined space), and a mobile antenna is continuously (or in some cases periodically) moved around the proximity of the items to interrogate and report the presence of the items. In some instances, a fixed antenna is located in one or more locations about the monitored space. When the RFID tags are interrogated by an RFID interrogator, information about the item (e.g., its unique identification, its location, etc.) is transmitted to the interrogator. Thus, inventory can be conducted continuously, which is particularly useful in the tracking of high priced items such as jewelry.

Importantly, the various pieces of equipment used to capture inventory and location data is highly secure and registered to both the location at which it is used and the other pieces of equipment with which it is used. By ensuring that only certain tags can be read be certain interrogators, and only certain interrogators can submit tag data to the local data store, the possibility of "spoofing" the system—that is, using rogue devices to submit false data—is virtually eliminated.

Therefore, in a first aspect of the invention, a system for securely monitoring high-value items (e.g., jewelry) includes an inventory-monitoring agent and a remote central monitoring service that securely communicates with the agent over a network. The agent includes an identification module that receives an identifier (such as a MAC address, IP address or other unique code) from an RFID scanning device and compares the received identifier to a list of trusted identifiers. By doing so, the agent can confirm that the RFID scanning device is a trusted device. The agent also includes a security module for limiting communications to trusted RFID scanning devices and a scanning module for receiving, from the trusted RFID scanning device, RFID tag scan data associated with a high-value item and a trusted RFID tag connected to the item. The agent also includes a local data store for storing the scan data (which in some cases may be stored using one or more encryption techniques). The central monitoring service includes a communications module for securely accessing the contents of the local data store.

In some embodiments, the system may also include a location-specific security module configured to prevent a user located at a local site from altering the contents of the local data store. A user interface may be provided (on a computer, personal data assistant, cell phone, RFID interrogator, or other such device) at one or more of the local installations to allow local users to view the data in the local data store. The system may also include a lockdown module that prevents local users from accessing the monitoring agent (and, by extension any configuration parameters associated therewith) thereby preventing tampering with the locally-installed software.

The central monitoring service may, in some implementations, include a remote data store for collecting and aggregating the contents of multiple local data stores. In some embodiments, the central monitoring service may also include a web-based reporting portal for providing remotely-located users with access to the contents of the remote data store and/or one or more of the local data stores. The scan data may include, for example, data describing the item such as its size, weight, owner, value, quality, price, SKU number and/or location, as well as a date/time stamp, user identifier, device identifier and/or tag identifier. In some cases, the users accessing the portal may include employees and/or owners of the locations from which the data is collected, whereas in other instances the users may be third parties having legal and/or financial interests in the items being tracked. The different users may be provided different levels of access, e.g., item-specific access versus aggregated data access.

In another aspect, the invention provides a method for monitoring high-value items. The method includes using an inventory-monitoring agent to uniquely identify an RFID scanning device as a trusted RFID scanning device by comparing an identifier transmitted from the RFID scanning device to a list of trusted identifiers and limiting communications to the trusted RFID scanning device. The method further includes receiving at the inventory-monitoring agent, from the trusted RFID scanning device, RFID tag scan data associated with a high-value item and a trusted RFID tag attached to the item and storing the result of the verification in a local data store. The verification results are then sent to a central monitoring service via a secure connection.

In some embodiments, users co-located with the inventory monitoring agent are blocked from gaining access to the local data store. However, in some cases, the data may be presented (typically in read-only fashion) to the users on a graphical user interface such as a personal computer or PDA. The central monitoring service may collect, and in some cases aggregate and process verification data from numerous local data stores in a remote data store. The data in the remote data store may be published via a web portal and/or provided to users in written form.

In another aspect, the invention provides software in computer-readable form for performing the methods described herein.

BRIEF DESCRIPTION OF DRAWINGS

In the drawings, like reference characters generally refer to the same elements throughout the different views. Also, the drawings are not necessarily to scale, emphasis instead generally being placed upon illustrating the principles of the invention.

DETAILED DESCRIPTION

Figure 1:
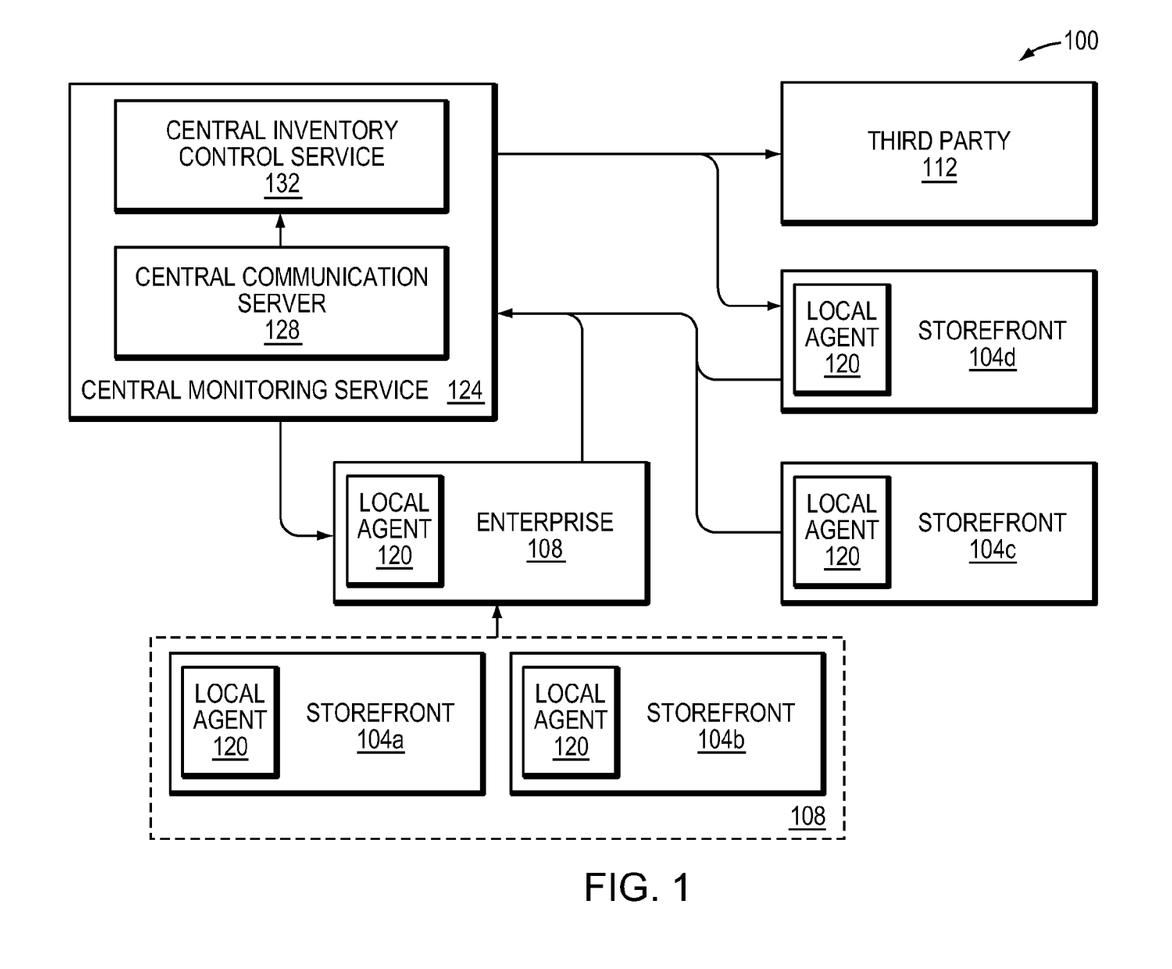
FIG. 1 is a block diagram of an environment in which the systems and techniques described herein may be implemented according to various embodiments of the invention.

FIG. 1 depicts an exemplary environment 100 in which the techniques and systems that embody the invention may be implemented. One or more storefronts 104a, 104b, 104c and 104d (generally, 104) provide physical locations at which consumers can shop for and purchase goods. In this example four storefronts 104 are shown, but any number of storefronts 104 may implement and use the invention. In the description below, reference is made to goods such as jewelry, precious metals, collectibles, art, antiques and other high-value goods that tend to fluctuate in value; the systems and methods described herein, however, may be used for any physical product. In the most common implementation of the invention, the storefronts 104 represent jewelry stores that carry a large inventory of small, individually identifiable pieces (referred to herein as "items") that, because of their intrinsic value, require constant monitoring. In some cases, multiple storefronts (104a and 104b, in this case) are "related" subsidiaries of a parent enterprise 108. In such cases, the enterprise 108 may also serve as a storefront 104.

In many cases, the items sold at the storefronts may be owned by a third party 112. This is especially true where the items have an intrinsic value that fluctuates widely due to commodities prices related to the components of the items. For example, the value of a piece of gold jewelry may change dramatically during the period the item is in inventory at a particular storefront 104. To protect his business from these fluctuations and to avoid having to constantly monitor the gold market, a shopkeeper will stock items that are actually owned by a third party 112 such as a bank, financier, manufacturer, supplier, or insurance company. These larger corporations are better able to finance the items through loans, hedging and other financial arrangements, and therefore provide the items to the storefronts 104 on a consignment basis.

However, rarely if ever do the third parties 112 have individuals on site at the storefronts 104 to monitor and confirm the presence and movement of the items they own. Instead, they either rely on the employees of the storefronts 104 or, in some cases, hire outside security firms (e.g., Brinks) to perform routine inventory checks. Embodiments of the current invention provide software, hardware and methods that, when employed at the storefronts 104 and at a central location, greatly enhances the validity and accuracy of the inventory data collected at the storefronts 104, and provides real-time access to such data by the third party financiers 112. In general, implementation of the techniques and systems described below includes two primary components—a local agent component 120 that collects and stores inventory data at the storefronts 104 and a central monitoring service 124 that facilitates centralized data collection, aggregation and reporting. The central monitoring service includes, generally, a central communications server (such as a web server) 128 to manage communications and data transmission with and among the local agents and a central inventory control service 132 to store and process the inventory control data, equipment registration, user roles and other application processes described in greater detail below.

Figure 2:
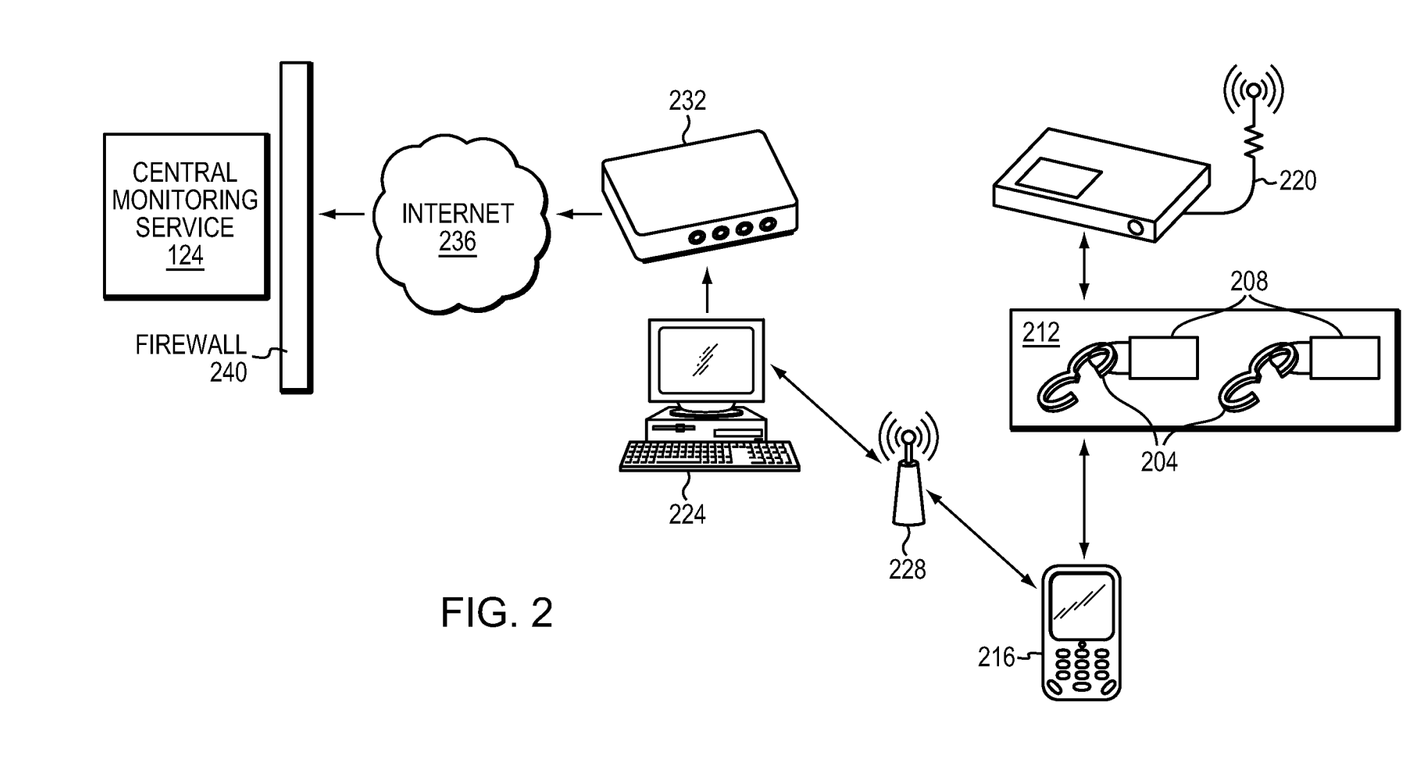
FIG. 2 is a schematic diagram of one embodiment of a location-based inventory control system in accordance with various embodiments of the invention.

More specifically and with reference to FIG. 2, items 204 are stored and presented for sale at storefront locations. To assist in tracking and monitoring the items 204, tamper-evident RFID tags 208 are attached to the items. Upon receiving an interrogation signal, the tags 208 transmit a response signal. The interrogation and response signals may be broadcast over a standard RFID band, such as the ISM band. The response signal includes information about the RFID tag such as a unique RFID tag number or other identifier. To ensure proper tracking, unique item identifiers or combinations of identifiers (e.g., SKU number, source, weight, description, etc.) are associated with the unique RFID tag number. Typically, the items are stored and/or displayed in a case 212 which also may have an attached RFID tag having a unique RFID tag number associated therewith. In such instances, information gathered regarding the items 204 may also include case information, thereby associating the item 204 with the case 212 in which it is stored. In some embodiments, fixed interrogators 220 may be placed about a storefront to continuously monitor the location and movement of RFID tags 208 as attached to the items 204. The interrogators 216 and 220 may operate at any suitable interrogation frequency and, with suitable changes in antenna design, may be applied to a wide range of frequencies and applications.

The interrogators 216 and 220 provide data to the local inventory control agent (120 of FIG. 1). In some cases, the interrogators are physically connected to a workstation 224 via a docking station or other wired connection (e.g., Ethernet, USB, FireWire, etc.). In other instances the scan data may be transmitted wirelessly to a receiver 228 via 802.11, Bluetooth or similar wireless protocol. In any case, the interrogators are capable of retaining the scan data in the event of an interruption in network connectivity, and, when network connectivity is restored, transmitting the scan data without any loss or corruption thereof.

The workstation is preferably implemented as a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS and GNU/Linux from RED HAT, INC. of Durham, N.C. (and others). The workstation may also be implemented on such hardware as a smart or dumb terminal, network computer, personal data assistant, wireless device, information appliance, workstation, minicomputer, mainframe computer, or other computing device that is operated as a general purpose computer or a special purpose hardware device solely used for serving as a workstation in the inventory monitoring and reporting system described herein.

The local control agent 120, operating on one or more local workstations 224, collects the scan data from the interrogators 216 and 220 and confirms that the tags and scanners are registered to the correct location and to each other. For example, upon receiving scan data from an interrogator, the local agent can confirm that a unique interrogator ID (e.g., a MAC address, IP address or other code associated with the device) received as part of the scan data matches one of the device IDs associated with the location. This confirmation step ensures that only approved devices are being used at a particular location. In some cases, the affiliation between the location and the device is stored locally, whereas in other cases it is stored remotely. In either case, users operating the interrogation devices are unable to alter or augment the list of approved devices, thereby significantly reducing the possibility that spoofed scan data is collected.

The local agent may be a standalone application written in C/C++, C#, Java or other appropriate client programming language. The local agent may be in the form of an application plug-in written in Visual Basic, C/C++, or C# that operates within a client application such as a web browser. Further, the local agent may be in the form of a standalone application, implemented in a multi-platform language such as Java, in a .Net Framework language such as C#, or in native processor executable code. In one embodiment, if executing on the workstation, the local agent opens a network connection to the central monitoring service over a communications network 236 and communicates via that connection to the central monitoring service. The local agent and the web browser may be part of a single client-server interface; for example, the local agent can be implemented as a "plug-in" to the web browser. The web browser is but one possible example of a client application, and others may include word processors, spreadsheets, operating system extensions, email clients, as well as others.

Once the scan data is collected and verified by the local agent, the data is sent to the central monitoring service 112. In most instances the data is transmitted via a router 232 and a private or public network 236. In the event that the network 236 is unavailable due to a connectivity failure, the data may be transmitted over a backup dial-up connection or retrieved manually. The network 236 connects the individual locations, each including a local inventory monitoring agent 120, with one or more servers that host the central monitoring service 112. The communication may take place via any media such as standard telephone lines, LAN or WAN links (e.g., T1, T3, 56 kb, X.25), broadband connections (ISDN, Frame Relay, ATM), wireless links, and so on. The communication between the central monitoring service and a local inventory monitoring agent 120 is through a firewall 240, which may control access to or from the inventory monitoring agent 120. Preferably, the network 236 carries TCP/IP protocol communications, and HTTP/HTTPS requests made by the local inventory monitoring agent 120 can be communicated over such TCP/IP networks. The type of network is not limited, however, and any suitable network may be used. Typical examples of networks that can serve as the communications network 236 include a wireless or wired Ethernet-based intranet, a local or wide-area network (LAN or WAN), and/or the global communications network known as the Internet, which may accommodate many different communications media and protocols.

The local control agent 120 sends both verification data (i.e., the scan data) and transaction data to the central monitoring service 112. The transaction data describes, for example, sales of the various items, and may be entered into the local control agent 120 manually or electronically. Both the verification data and the transaction data may be automatically migrated to the central monitoring service 112 on a periodic basis, for example once per day. The transaction data may also be migrated manually. Verification, however, can be performed only at the request of the central monitoring agent 112, and may not be manually overridden. The verification and transaction data may be compressed and/or encrypted before sending via, for example, a secure FTP channel.

The data is backed up locally in each storefront. In the event of a temporary system failure, recovery of the local control agent data can be performed by restoring from the last backup snapshot. Alternatively, the local control agent data may be recovered from the last data migrated to the central monitoring service 112. In a worst-case scenario, on-hand inventory data may be fully and reliably restored by scanning all the RFID tagged items at the location, which effectively reconstructs a reliable record of information.

Figure 3:
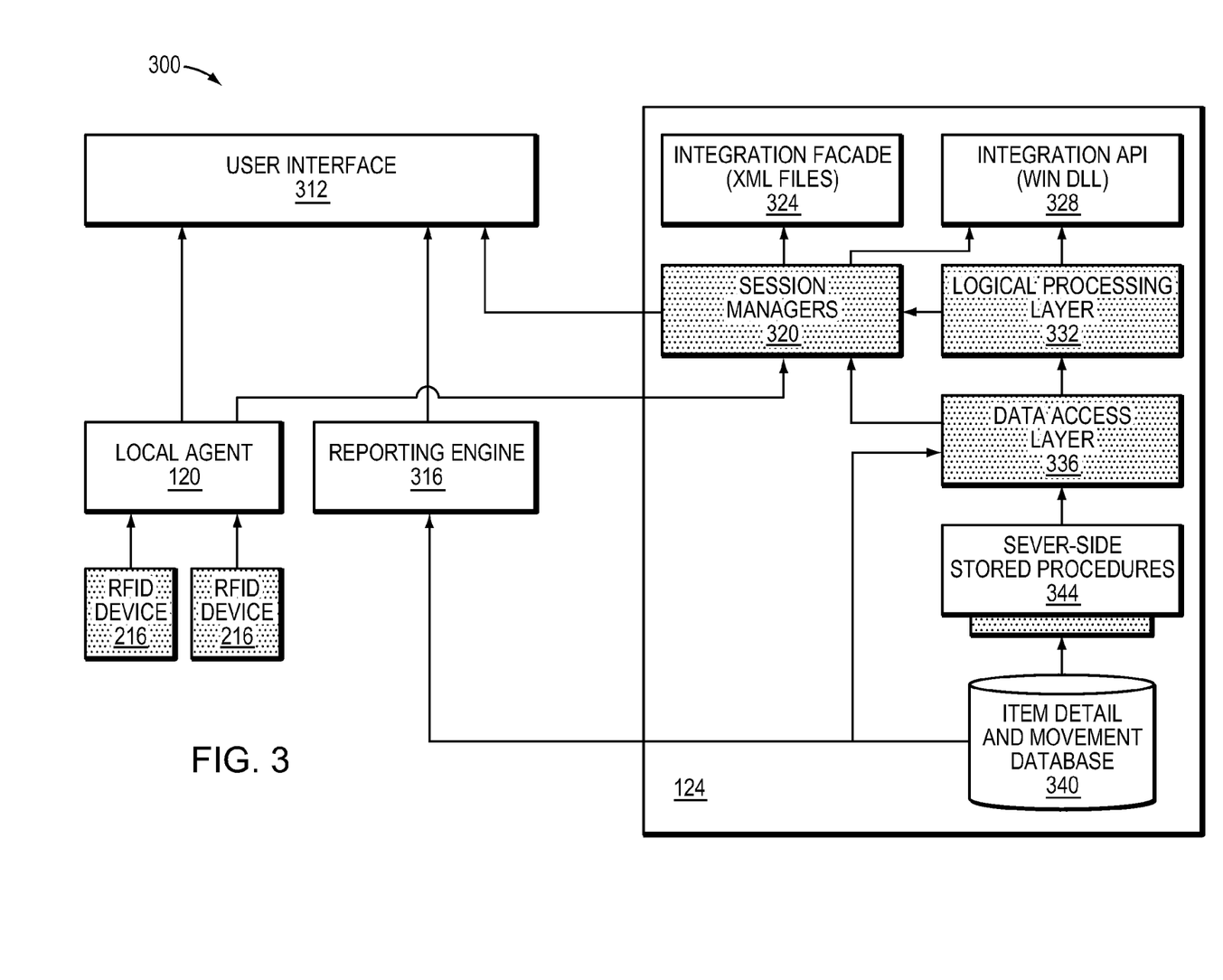
FIG. 3 is a more detailed schematic diagram of one embodiment of a location-based inventory control system in accordance with various embodiments of the invention.

FIG. 3 illustrates, in greater detail, the various functional components of a system 300 for monitoring and tracking high-value goods according to one embodiment of the invention. As described above, the system includes a local agent 120 and a central monitoring service 124. In some implementations, the local agent 120 produces a user interface 312 on a local device such as a personal computer, personal data assistant, cellular telephone, and/or an RFID scanner device. In some cases, the functionality of the local user interface 312 is limited to data display only, that is, users at the local storefront cannot enter or modify data via the user interface 312. In other implementations, the user interface 312 includes data entry and/or edit capabilities; access to such capabilities, however, is limited to users that provide proper authentication credentials in the form of a password (fixed or one-time use), secure token, proximity card and/or biometric.

For example, a storefront may have a single computer terminal (either dedicated or shared) on which the local agent 120 operates. The terminal may be used by staff members for retrieving general product information, payroll, billing or other functions; access to the inventory control agent, however, is strictly limited. At the same time, an employee or agent of a third party (112 of FIG. 1, for example) may periodically visit the storefront and, with proper authentication, access, input, monitor and/or confirm locally-stored data. Certain stores may sell items owned and/or financed by multiple third parties, and in such cases the data input/review functions provided to an individual may be limited to only those items owned by the third party he represents. In some instances, a reporting engine 316 provides electronic and/or paper-based reports that detail the inventory on hand at the storefront.

Once inventory and tracking data has been collected at the local storefronts, it is then periodically (or in some cases continuously) transmitted to the central monitoring service 124. In most implementations, the transmission of inventory data occurs in a secure manner, using, for example, encryption and/or key-based authentication to ensure that the data being ingested into the central monitoring service 124 is from a trusted source.

In certain implementations, communication between the local agent and the central repository occurs over the Internet, and therefore uses the Hypertext Transfer Protocol ("HTTP" or "HTTPS"). However, because HTTP is stateless protocol, the browser applications at each storefront client must establish a new network connection to a web server operating at the central service with each new HTTP GET or POST request. Therefore, the system includes a session manager 320 to facilitate session state tracking and management. For example, once a user (or application) has been authenticated to the web server, her next HTTP request (GET or POST) does not request reauthentication. One technique for implementing session management includes the use of HTTP cookies and other client-persistent data constructs. The session information is stored on the web server using a session identifier (session ID) generated as a result of the first (sometimes the first authenticated) request from the remote application. The "storage" of session IDs and the associated session data (user name, account number, etc.) on the web server may be accomplished using a variety of techniques including, but not limited to: local memory, flat files and databases. In implementations that utilize a service oriented architecture, http://en.wikipedia.org/wiki/Service_oriented_architecture Simple Object Access Protocol ("SOAP") messages constructed using with XML messages may be used by the local agent to cause web servers to create sessions.

In some embodiments, the central monitoring service may integrate with (e.g., act as a data consumer or provider for) other applications, including legacy systems using alternative architectures. Therefore, in such cases, one or more integration facades and/or integration APIs are provided that permit structured interoperability between the central monitoring service and other applications.

The underlying functionality of the central monitoring service is implemented in two layers—a logical processing layer and a data access layer. The logical processing layer includes the programmed instructions for providing the functional operations described below with respect to inventory tracking, device registration, user authentication and reporting. The data access layer receives data processing instructions (typically in the form of SQL statements) for inserting, deleting, modifying, retrieving and otherwise manipulating data. The data access layer may use any one of many standard data access protocols (ODBC, vendor-specific data access APIs, etc.) to access data stored in a central database. The central database provides data to the logical processing layer via the data access layer. Examples of database server software used to implement the central database includes the MySQL Database Server by Sun Microsystems of Santa Clara, Calif., the PostgreSQL Database Server by the PostgreSQL Global Development Group of Berkeley, Calif., or the ORACLE Database Server offered by ORACLE Corp. of Redwood Shores, Calif. Certain database functions may be implemented as stored procedures 344, which operate independently of user or application commands. Examples of such functions include periodic reporting (e.g., monthly batch reports), database integrity checks, etc.

Figure 4:
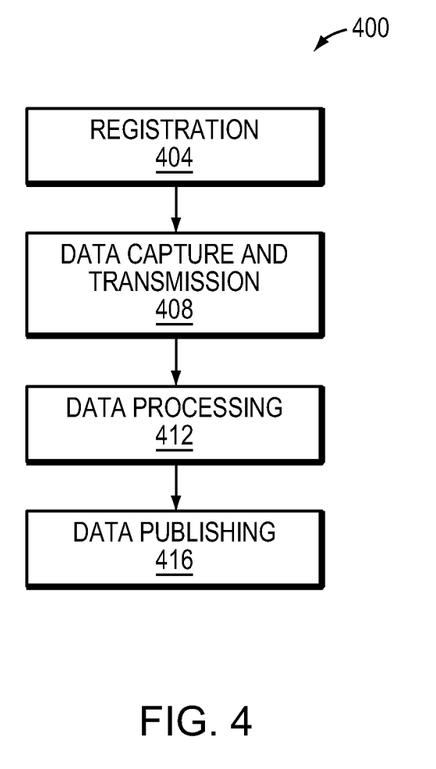
FIG. 4 is a flow chart summarizing a process for remotely and securely monitoring inventory in accordance with one embodiment of the invention.

Referring now to FIG. 4, the above-described system facilitates an inventory monitoring and control methodology 400 that includes four high-level phases. Initially, a system is implemented at one or more locations during which the tags, items, interrogators and local agent software is registered (STEP 404). Once implemented at the storefront, shopkeepers and/or third party agents capture inventory data and, using the local agent, transmit the data to the central monitoring service (STEP 408). The inventory and monitoring data from multiple storefronts is then authenticated, aggregated and formatted into various management and tracking reports (STEP 412) and published via an online data portal (STEP 416). Each of these steps are described in greater detail below.

Figure 5:
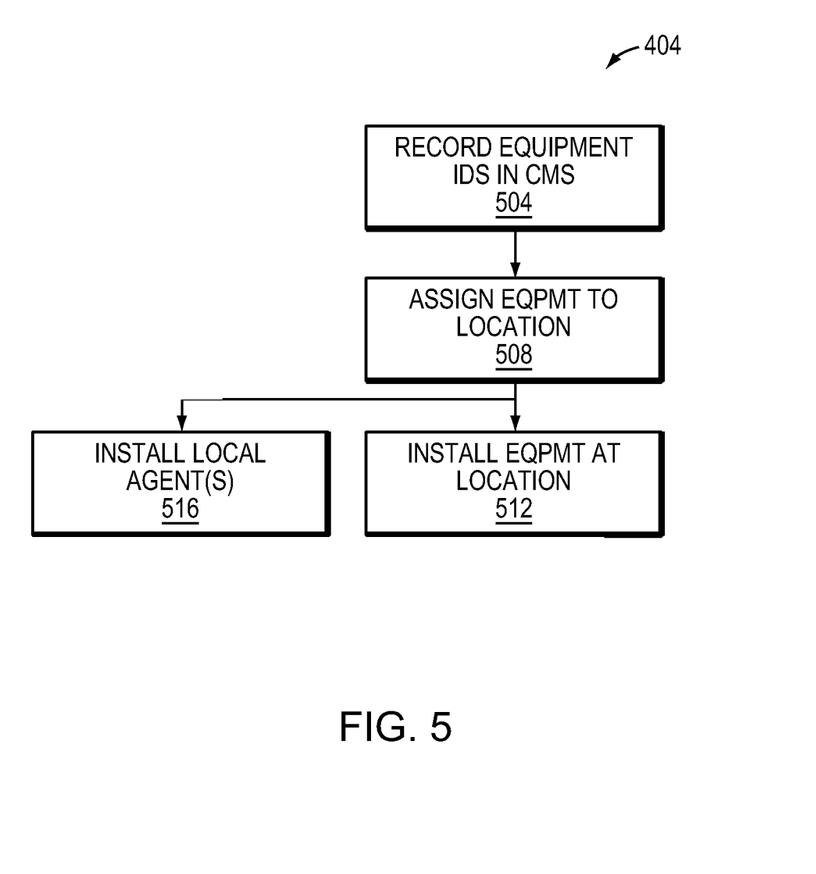
FIG. 5 is a flow chart depicting the registration process of the inventory management process of FIG. 4 in accordance with one embodiment of the invention.

Referring to FIG. 5, the registration process (STEP 404) includes the recordation and assignment of hardware to a particular location and to other components of the system. Initially, a unique equipment identifier for each piece of equipment (RFID interrogators, hand-held scanners and RFID tags) is logged into the central monitoring service (STEP 504). As such, data received at the central monitoring service can include the unique ID associated with the piece of equipment that collected and/or transmitted the data for validation against a list of registered devices, minimizing the likelihood that data from "rogue" devices will be entered. Once registered, the equipment is then assigned to a particular location (STEP 508). Further, RFID tags are attached to each item and the association of tag ID to item ID (e.g., SKU and/or description) is recorded. As noted above, by limiting the accepted data to that which was collected from devices registered to specific locations, the ability for unscrupulous individuals to use devices at multiple locations is reduced or eliminated. The equipment is then installed at the registered location (STEP 512), typically by an agent of the third party owner/financier. The system may restrict or limit access to some or all of the data collected at the locations based on the status of the user attempting to access the system. An authorized agent of a third party, for example, may be granted full access to the system, while a retail staff member has only limited access. The authorized agent may access the system on-site or remotely.

In conjunction with the installation of registered monitoring equipment, the local agent is installed on a local workstation (STEP 516). Like the physical equipment, each instance of a local agent is assigned a unique key that is attributed to the workstation on which it operates and to the location of the storefront. Again, such steps provide significant security improvements over conventional systems by ensuring data collected at and transmitted from a particular location has not been tampered with, spoofed or otherwise manipulated to hide theft or embezzlement. A first inventory scan may be performed to capture initial inventory data for subsequent comparison. In some cases, the initial inventory data may be provided from a pre-existing inventory system via an automated or semi-automated data conversion process.

The data collection and transmission step (STEP 408) can occur any time after registration. In some instances, data collection occurs on a regular basis (e.g., nightly) whereas in other cases the monitoring may occur at random times. In many implementations, the process of collecting and confirming inventory data is performed by a trusted agent of the owner/financier of the high-value items, whereas in other cases a storefront employee performs the tasks. In some cases in which RFID interrogators are placed at fixed locations about a retail establishment, the data collection may occur automatically.

Figure 6:
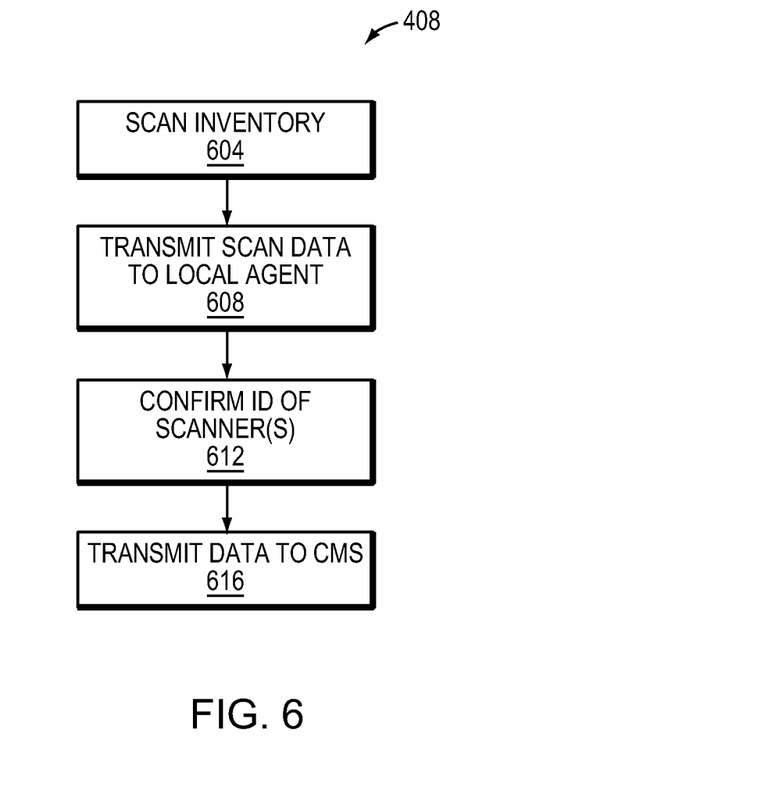
FIG. 6 is a flow chart depicting the data capture and transmission process of the inventory management process of FIG. 4 in accordance with one embodiment of the invention.

Referring to FIG. 6, the data collection process (STEP 408) is initiated by scanning the inventory (STEP 604), which may contain thousands of items and associated RFID tags. As described above, the scanning process may be performed using mobile, hand-held RFID interrogators and/or fixed devices placed in display cases, entrances and exits, and other key locations. The scanning process includes interrogating each RFID tag within the range of the interrogator and capturing RFID tag identifiers which, when matched with the RFID identifiers in the central data store, indicate which items were scanned. The RFID data is transmitted to the local agent (STEP 608) using a wired or wireless connection. The transfer may occur in real-time or in asynchronous batch transfers upon presentation of the RFID interrogator to the workstation on which the agent operates.

Upon receiving scan data, the local agent confirms that the data was in fact captured by interrogators assigned to that location (STEP 612) and that the RFID tags are associated with the readers and with the location. If, for example, a batch of scan data is presented to the local agent that indicates a non-authenticated interrogator was used (either because of an incorrect ID or a missing ID) the local agent may reject the data and provide the user with an appropriate message. Any data known to be from interrogators assigned to that location is then transmitted to the central monitoring service (STEP 616) via a secure transmission.

Figure 7:
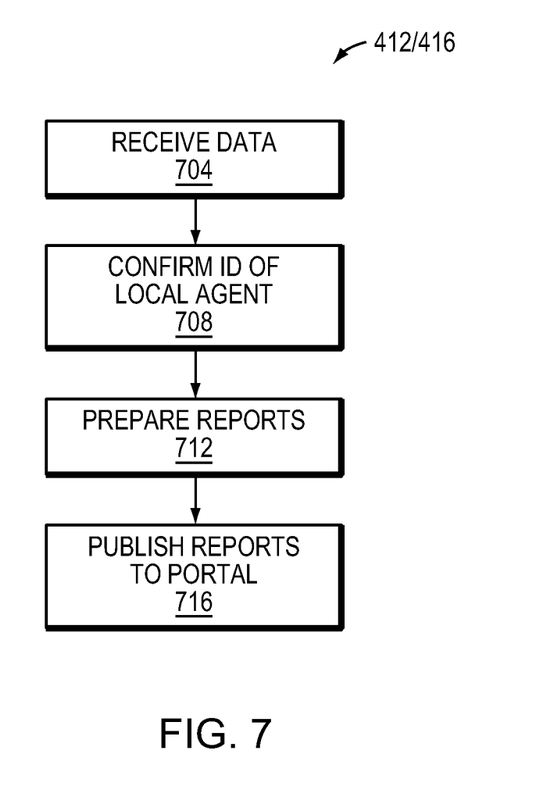
FIG. 7 is a flow chart depicting the data processing and reporting process of the inventory management process of FIG. 4 in accordance with one embodiment of the invention.

Referring to FIG. 7, once inventory scan data is received at the central monitoring service (STEP 704), additional authentication checks may be performed. For example, the central monitoring service may confirm that the received data is tagged with the correct combination of location ID, local agent ID, interrogator ID and tag ID(s) (STEP 708). Any discrepancies may be flagged and documented in exception reports. If an item is not accounted for during a certain span of time or for a series of scans (for example, 48 hours or three consecutive scans), the central monitoring service may report that the item be decommissioned. Additional standard and/or customizable inventory and monitoring reports are then compiled using the scan data (STEP 712) and provided via hard copy and/or an online portal (STEP 716).

In some embodiments, the methods and techniques of the present invention described herein may be implemented in hardware or software, or a combination of both. In such an embodiment, the program may be written in any one of a number of high-level languages, such as FORTRAN, PASCAL, C, C++, C#, Java, Tcl, or BASIC and stored on physical media such as an optical or magnetic disc. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

The scope of the invention is thus indicated by the appended claims and all changes which come within the meaning and range of equivalency of the claims are therefore intended to be embraced.

What is claimed is:

1. A system for securely monitoring high-value items, the system comprising:
   (a) an inventory-monitoring agent comprising:
      (i) an identification module for receiving an identifier from an RFID scanning device and comparing the received identifier to a list of trusted identifiers, thereby confirming that the RFID scanning device is in a set of one or more trusted RFID scanning devices associated with a plurality of trusted RFID tags, wherein the trusted RFID tags are registered to and authenticatably readable only by the set of trusted RFID scanning devices;
      (ii) a scanning module for receiving, from the RFID scanning device, RFID tag scan data associated with a high-value item and an RFID tag, and verifying that the RFID tag is one of the trusted RFID tags registered to and authenticatably readable by the RFID scanning device; and
      (iii) a local data store for storing the scan data; and
   (b) a central monitoring service located remotely from and in secure communication with the inventory-monitoring agent, the central monitoring service comprising a communications module for securely accessing the contents of the local data store.

2. The system of claim 1 further comprising a security module for preventing a local user from altering the contents of the local data store.

3. The system of claim 1 wherein the system further comprises a user interface for displaying the scan data to a local user.

4. The system of claim 3 wherein the user interface comprises a personal data assistant.

5. The system of claim 1 further comprising a lockdown module for preventing a local user from accessing the inventory monitoring agent.

6. The system of claim 1 wherein the contents of the local data store is encrypted.

7. The system of claim 1 wherein the central monitoring service further comprises a remote data store for aggregating the contents of multiple local data stores.

8. The system of claim 1 wherein the central monitoring service further comprises a web portal for providing access to the contents of one or more of the local data stores to a remote user.

9. The system of claim 8 further comprising an authentication module for determining a trust level associated with the remote user.

10. The system of claim 1 wherein the inventory-monitoring agent provides different levels of access based on the type of user seeking access.

11. The system of claim 1 wherein the high-value item comprises an item of jewelry.

12. The system of claim 1 wherein the identifier comprises a MAC address.

13. The system of claim 1 wherein the scan data comprises an RFID tag identifier.

14. A method for monitoring high-value items, the method comprising:
   identifying, at an inventory-monitoring agent, an RFID scanning device as being in a set of one or more trusted RFID scanning devices associated with a plurality of trusted RFID tags by comparing an identifier transmitted from the RFID scanning device to a list of trusted identifiers, wherein the trusted RFID tags are registered to and authenticatably readable only by the set of trusted RFID scanning devices;
   limiting communications to the trusted RFID scanning devices;
   receiving, at the inventory-monitoring agent, from the RFID scanning device, RFID tag scan data associated with a high-value item and an RFID tag;
   verifying that the RFID tag is one of the trusted RFID tags registered to and authenticatably readable by the RFID scanning device;
   storing the result of the verification and the RFID tag scan data in a local data store; and
   transmitting the result of the verification and the RFID tag scan data to a central monitoring service via a secure connection.

15. The method of claim 14 further comprising blocking a local user from altering the contents of the local data store.

16. The method of claim 14 further comprising displaying, on a user interface, the result of the verification to a local user.

17. The method of claim 14 further comprising aggregating, at the central monitoring service, data from the local data store on a remote data store.

18. An article of manufacture having computer-readable program portions embodied thereon for verifying the presence of high-value items; the article comprising computer-readable instructions for:
   identifying, at an inventory-monitoring agent, an RFID scanning device as being in a set of one or more trusted RFID scanning devices associated with a plurality of trusted RFID tags by comparing an identifier transmitted from the RFID scanning device to a list of trusted identifiers, wherein the trusted RFID tags are registered to and authenticatably readable only by the set of trusted RFID scanning devices;
   limiting communications to the trusted RFID scanning devices;
   receiving, at the inventory-monitoring agent, from the RFID scanning device, RFID tag scan data associated with a high-value item and an RFID tag;
   verifying that the RFID tag is one of the trusted RFID tags registered to and authenticatably readable by the RFID scanning device;
   storing the result of the verification and the RFID tag scan data in a local data store; and
   transmitting the result of the verification and the RFID tag scan data to a central monitoring service via a secure connection.

19. The system of claim 1, wherein the central monitoring service logs identifiers associated with one or more RFID tags and one or more RFID scanning devices, and assigns the identifiers to one or more locations and to each other.

20. The method of claim 14, further comprising logging identifiers associated with one or more RFID tags and one or more RFID scanning devices, and assigning the identifiers to one or more locations and to each other.

21. The article of manufacture of claim 18, wherein the article comprises further computer-readable instructions for logging identifiers associated with one or more RFID tags and one or more RFID scanning devices, and assigning the identifiers to one or more locations and to each other.

22. The system of claim 1, wherein at least one of the trusted RFID scanning devices is registered to a location associated with the high-value item.

23. The system of claim 22, wherein at least one of the trusted RFID tags is registered to the location associated with the high-value item.

24. The system of claim 23, wherein the scanning module is further for verifying that the trusted RFID scanning device and the RFID tag are registered to the location associated with the high-value item.

25. The system of claim 24, further comprising a local agent module having a unique key and registered with the location associated with the high-value item, and wherein the central monitoring service further comprises an authentication module for verifying that the scan data comprises a valid combination of the local agent unique key, the scanning device identifier, an identifier associated with the location, and an identifier associated with the RFID tag.

* * * * *